(12) United States Patent
Kirkland et al.

(10) Patent No.: US 11,354,527 B2
(45) Date of Patent: Jun. 7, 2022

(54) LABELLING SCHEME AND APPARATUS

(71) Applicant: Oxford University Innovation Limited, Oxford (GB)

(72) Inventors: Angus Ian Kirkland, Oxford (GB); Paul Ewart, Oxford (GB); Konstantin Borisenko, Oxford (GB); Ben Williams, Oxford (GB); Andrew Luers, Oxford (GB); Giuliano Siligardi, Oxford (GB); Rohanah Hussain, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 16/970,043

(22) PCT Filed: Feb. 19, 2019

(86) PCT No.: PCT/GB2019/050452
§ 371 (c)(1),
(2) Date: Aug. 14, 2020

(87) PCT Pub. No.: WO2019/158953
PCT Pub. Date: Aug. 22, 2019

(65) Prior Publication Data
US 2021/0271839 A1  Sep. 2, 2021

(30) Foreign Application Priority Data
Feb. 19, 2018 (GB) .................................. 1802661

(51) Int. Cl.
*G06K 7/14* (2006.01)
*B42D 25/305* (2014.01)
(Continued)

(52) U.S. Cl.
CPC .............. *G06K 7/1447* (2013.01); *B41J 3/01* (2013.01); *B41J 3/4075* (2013.01);
(Continued)

(58) Field of Classification Search
None
See application file for complete search history.

(56) References Cited

U.S. PATENT DOCUMENTS

| 2003/0141441 A1 | 7/2003 | Kawano et al. |
| 2004/0240006 A1 | 12/2004 | Staub et al. |

(Continued)

FOREIGN PATENT DOCUMENTS

| CN | 1589455 A | 3/2005 |
| CN | 1918506 A | 2/2007 |

(Continued)

OTHER PUBLICATIONS

International Search Report and Written Opinion for PCT/GB2019/050452, dated May 7, 2019, pp. 1-14.
(Continued)

*Primary Examiner* — Kristy A Haupt
(74) *Attorney, Agent, or Firm* — Thomas|Horstemeyer, LLC

(57) ABSTRACT

A method and system for writing a label (defined within a predetermined region of the sample 110), the label displaying a visible layout of light-modified regions in a predetermined spatial arrangement. The method comprises: modifying regions of a material within the label using light, wherein the modifying comprises using light of a first polarisation state to provide photo-induced optically active regions of a first type having a first optical activity state which is characteristic of having been formed by light of the first polarisation state, in order to encode covert information in the label using the locations of the first type of light-modified regions within the spatial arrangement of the label.

19 Claims, 7 Drawing Sheets

Figure 2:
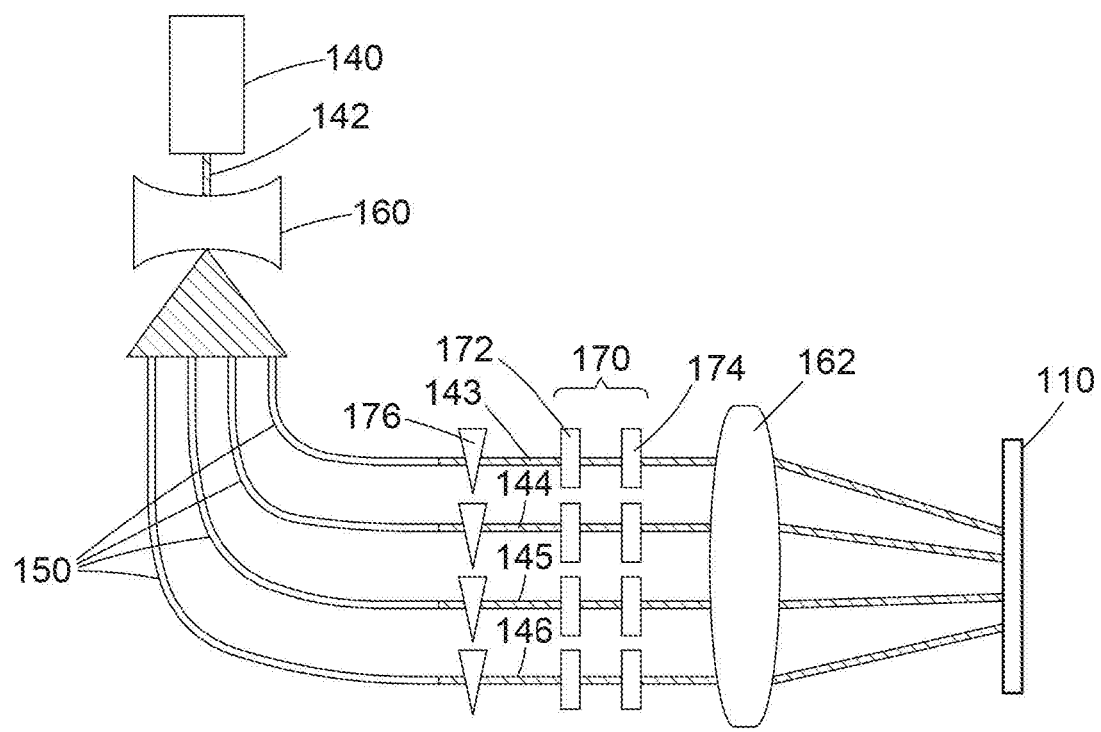

(51) Int. Cl.
  *B42D 25/41*   (2014.01)
  *G06K 7/10*    (2006.01)
  *B41J 3/01*    (2006.01)
  *B41J 3/407*   (2006.01)

(52) U.S. Cl.
  CPC ........... *B42D 25/305* (2014.10); *B42D 25/41* (2014.10); *G06K 7/10732* (2013.01)

(56) References Cited

U.S. PATENT DOCUMENTS

2008/0166528 A1* 7/2008 Power .................... B42D 25/29
                                                428/195.1
2014/0211071 A1* 7/2014 Pawlik .................... G06K 7/10
                                                348/335

FOREIGN PATENT DOCUMENTS

| CN | 103081011 A | 5/2013 |
| RO | 132008 A2   | 6/2017 |
| WO | 02/053462 A2 | 7/2002 |

OTHER PUBLICATIONS

UK Search Report for GB 1802661.7, dated Aug. 15, 2018, pp. 1-4.
Office Action for Chinese Patent Application 2021091301783430, dated Sep. 16, 2021, pp. 1-13 (translation not available).

* cited by examiner

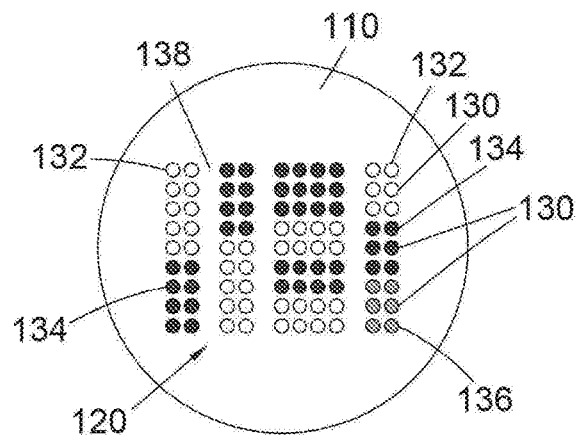
Fig. 1A
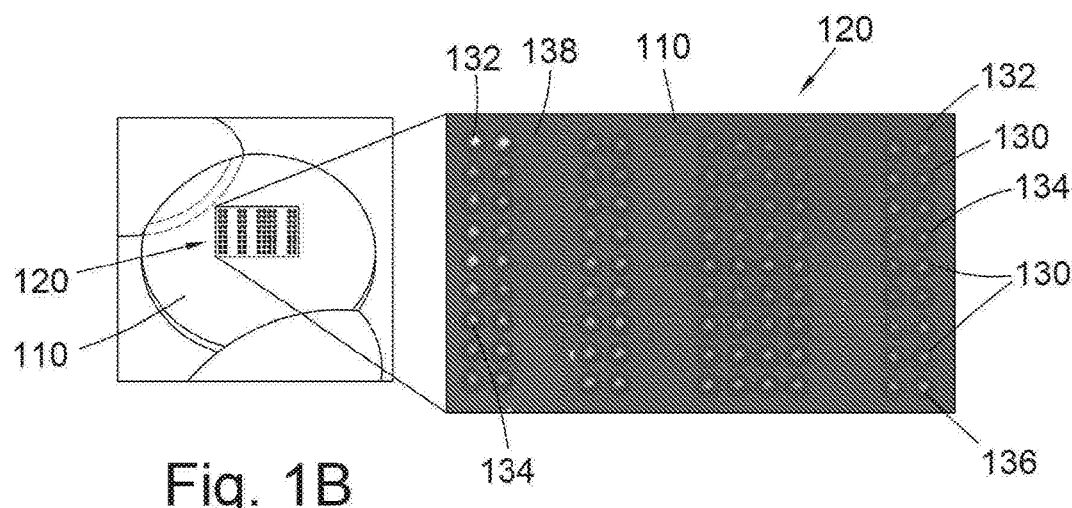
Fig. 1B
Fig. 1C
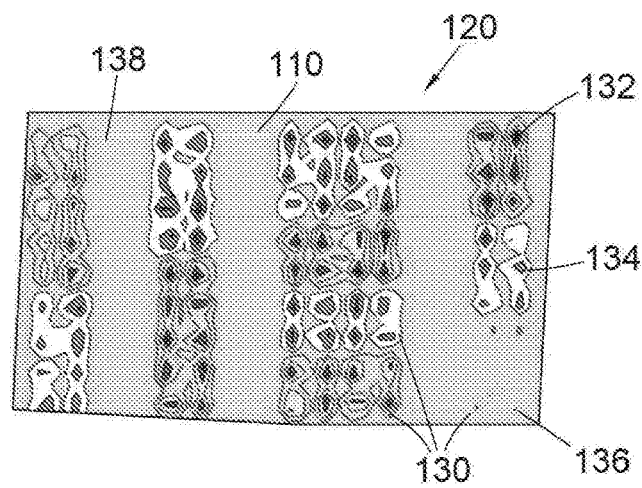
Fig. 1D

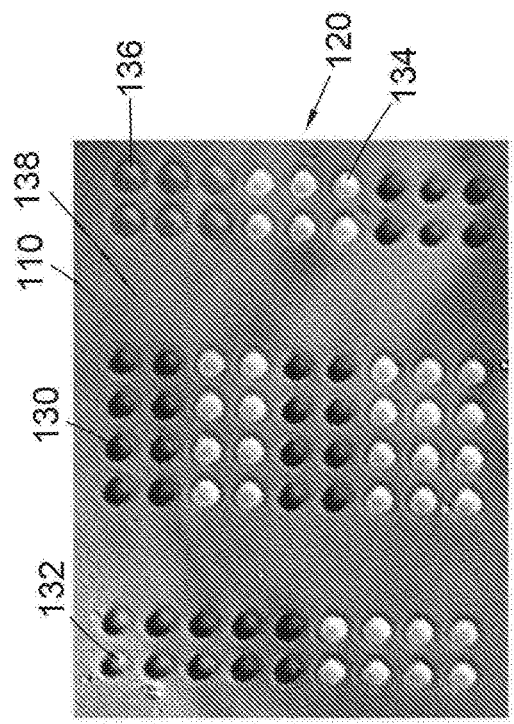
Fig. 8C
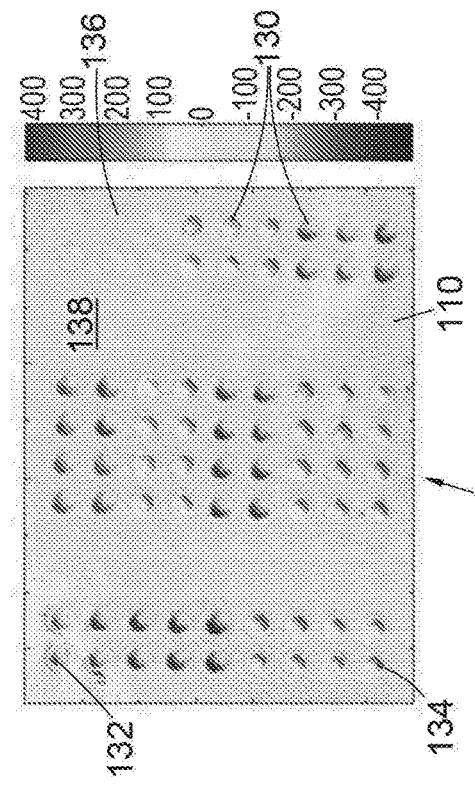
Fig. 8D
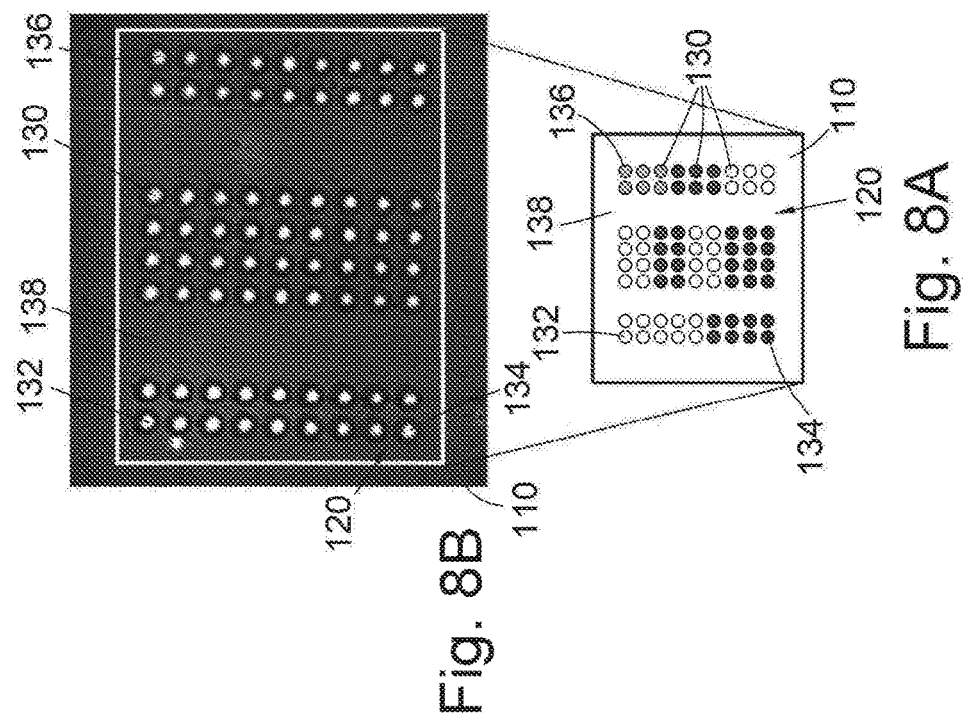
Fig. 8B
Fig. 8A

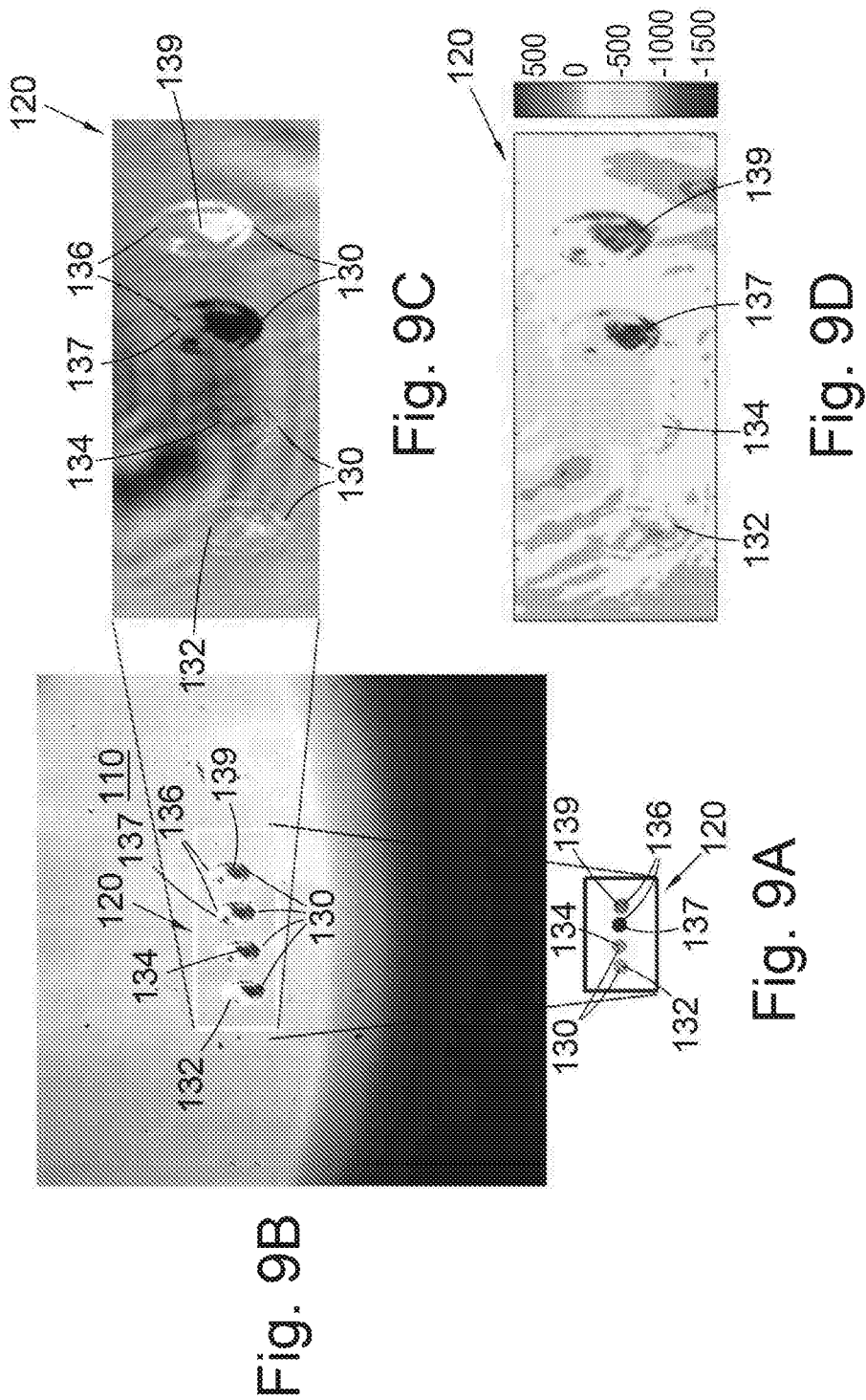

LABELLING SCHEME AND APPARATUS

CROSS-REFERENCE TO RELATED APPLICATIONS

This application is the National Stage of International Application No. PCT/GB2019/050452, filed Feb. 19, 2019, which claims priority to GB 1802661.7, filed Feb. 19, 2018, which are entirely incorporated herein by reference.

FIELD OF THE INVENTION

The present invention relates to a method and apparatus for writing a label, a method and apparatus for reading a label, and a sample with a label written therein. Particularly the invention relates to a method for writing a label having a plurality of light-modified regions with characteristic optical properties.

BACKGROUND

It is often necessary to mark or label an item for the sake of identification, validation, accreditation and so on. For example, trade marks are displayed on products to indicate their origins to a consumer. Barcodes are commonly fixed to the packaging of products to identify them for sale. Quick response (QR) codes encode information that e.g. may be scanned to direct a consumer to a website. Security holograms are used to indicate the authenticity of consumer electronics because they are difficult to forge.

There are a great many applications for labels, and the specific characteristics required of a particular label will be dependent upon how the label is to be used. In some cases it is desirable to label an item with a covert feature, so that the item cannot be easily copied or can only be verified by an authorised party. For example, modern coinage and banknotes in the UK display some labels only under illumination by particular frequencies of ultraviolet light.

While many such methods for covert labelling exist, there remains a need for continuing improvement in the field. Such labels often need to be durable to mechanical wear and changes in temperature, easily made, and reliably read.

SUMMARY OF THE INVENTION

According to a first aspect of the present invention there is provided a method of writing a label, the label displaying a visible layout of light-modified regions in a predetermined spatial arrangement, the method comprising: modifying regions of a material within the label using light, wherein the modifying comprises using light of a first polarisation state to provide photo-induced optically active regions of a first type having a first optical activity state which is characteristic of having been formed by light of the first polarisation state, in order to encode covert information in the label using the locations of the first type of light-modified regions within the spatial arrangement of the label.

The optically active regions of the first type are formed by exposure of the material to light of a first polarisation state (for example, left circular polarisation, right circular polarisation, left elliptical polarisation, right elliptical polarisation, linear horizontal polarisation, linear vertical polarisation etc.). The light exposure must be above an energy threshold required for modification of the material. During formation, molecules and/or crystallites of the material are aligned by the electromagnetic field of the modifying light into an arrangement characteristic of the electromagnetic field, i.e. characteristic of the light's polarisation. For example, the molecules and/or crystallites of material exposed to left circularly polarised (LCP) light will align so as to create a left-chiral formation between them. Similarly a right chiral formation will be created by exposure to right circularly polarised (RCP) light. Molecules and/or crystallites exposed to linearly polarised light will align linearly with the electromagnetic field of the modifying light.

As a consequence of the their molecular and/or crystallite configuration, the light-modified regions of the first type will exhibit optical activity when exposed again to light of a first polarisation state—i.e. a polarisation state which is the same as that of the light which originally created the modified region. For example, light-modified regions formed by right circularly polarised (RCP) light will transmit right circularly polarised (RCP) light more efficiently than other polarisations. Hence, they will appear brighter when illuminated from behind with RCP light. These regions will also reflect LCP light more efficiently and hence will appear brighter when illuminated from the front with LCP light.

A similar phenomenon happens for laser modification by light of a linear polarisation. The molecules and/or crystallites within the modified region are aligned by the electromagnetic field of the modifying light into an arrangement characteristic of the electromagnetic field, i.e. characteristic of the light's linear polarisation. Then, these modified regions exhibit optical activity characteristic of their arrangement, and hence interact with linearly polarised light more strongly than other polarisations.

It is therefore possible to create a label comprising spatially arranged light-modified regions of different types of optical activity. Since, ambient light is a mixture of random polarisations, light-modified regions of all types will appear substantially the same under ambient illumination and hence will display a visible layout. As such, the label may comprise a spatial arrangement of modified regions encoding information which is generally visible under ambient light or the like—for example, in the same way a typical barcode, QR code, number, word or the like encodes and displays information. Moreover, a covert (i.e. not openly displayed) spatial arrangement of light-modified regions may be revealed by illuminating the label with light of a particular polarisation of light (or by light comprising a substantial proportion of light of a particular polarisation). Thus a subset of the light-modified regions may be revealed as exhibiting an optical activity and hence may themselves encode covert information. The covert arrangement of these modified regions thus hides additional information within the label. Thus, the label may encode both overt and covert information within an overt label which can be recognised as a label by the naked eye. The label may appear differently under illumination by different polarisations of light and ambient light.

It is well understood that positioning and/or sizing of defining marks within a specified region may be used to convey information. For example, a barcode achieves such an encoding of information by relative locations and sizes of vertical lines within a finite region. A quick response code ('QR' code) achieves a similar encoding of information. Indeed, a photograph or even a written word also encodes information therein. It will be appreciated that a wide variety of ways of encoding information is possible and the invention is not limited to any particular scheme or type of information encoding.

The material in which the label is written may be any suitable material in which optically active regions may be formed by modification by light. For example, the material Ge$_2$Sb$_2$Te$_5$ (GST) may be particularly suitable by virtue of its being relatively easy to modify and being robust enough to hold a written modification for a sufficient period of time. Other types of chalcogenide material may be used, and other types of phase change material may be used.

The chalcogenide material may comprise one or more chalcogen elements, e.g. selected from O, S, Se, Te and Po, and one or more electropositive elements, e.g. selected from N, Si, Ni, Ga, Ge, As, Ag, In, Sn, Sb, Au, Pb and Bi. The chalcogenide material may be in the form of a binary, ternary, or quaternary alloy.

The material may comprise a chiral fragment which can exist in the material in a plurality of non-superimposable forms. For example, a nitrogen-doped chalcogenide material containing Ge may contain a cluster of nitrogen and germanium atoms which can exist in at least two non-superimposable forms.

Thus, the material may comprise any material that can be transformed from a non-chiral (achiral) amorphous state to a state with retained or sculpted chirality (or optical activity caused by circular or linear birefringence) induced by one or more light pulses having a particular polarisation state.

The step of modifying a region with light may comprise using any suitable light source. For example, the light source may be a lamp such a xenon lamp or a tungsten lamp, or may be suitable laser. Therefore, modifying a region may comprise laser modifying a region, and light-modified regions may be laser modified regions.

The modifying may comprise using light or laser pulses of a second polarisation state to provide photo-induced optically active regions of a second type having a second optical activity state which is characteristic of having been formed by light of the second polarisation state, in order to encode covert information in the label using the locations of the second type of laser modified regions within the spatial arrangement of the label. As such, laser modified regions may be either the first type or the second type. Each type of region will respond differently under different polarised illumination and hence another degree of freedom exists in which to encode information. The second polarisation state may be different to the first, and where the first polarisation state has a chirality (i.e. a handedness, for example right-handed), the second polarisation may have the opposite chirality (for example, left-handed).

The laser modifying may comprise using laser pulses of a third polarisation state to provide photo-induced optically active regions of a third type having a third optical activity state which is characteristic of having been formed by light of the third polarisation state, in order to encode covert information in the label using the locations of the third type of laser modified regions within the spatial arrangement of the label. The third polarisation state may be different to the first and second polarisation states. For example, the third polarisation state may be linear polarisation (LP). As such, the optical activity of the third type of laser modified regions may be different to that of the first and second types, and another degree of freedom may be available for encoding information within the label.

Then, each laser modified region may have one of three types of optical activity, discoverable by suitable illumination or a suitable reading method. Moreover, a region of the label may be left unmodified, which is another type of optical activity (i.e. optical property) in which the region behaves the same under all types of illumination. Each region of the label, modified or not, can therefore comprise one of four types of optical activity to encode information. The information storage density of the label may therefore be increased as compared to a standard binary label (such as 0 and 1 bit), in which a region may be modified or not, providing two degrees of freedom.

The method may comprise predetermining locations and types of each of the laser modified regions. It may comprise encoding a number or any other information into a spatial arrangement of marks for writing into the label. The method may comprise converting the information into a base-4 system for representation by units of 4 degrees of freedom (analogous to the use of bits in a binary system).

The first polarisation state may be one of linear polarisation, left circular polarisation, and right circular polarisation. The second and/or third polarisations may be the others of the linear, left circular and right circular polarisation, so that the first, second, and third polarisation states are any permutation of linear polarisation, left circular polarisation, and right circular polarisation. Such polarisation states may be used in combination with un-modified regions (e.g. of an amorphous achiral material) to encode the covert information.

Where linear polarisation is used, the method may also permit differentiation between modified regions formed by vertical polarisation and modified regions formed by horizontal polarisation. The method may also permit differentiation between modified regions formed by linear polarisation aligned at a tilted angle in between the horizontal and vertical. Thus, but modifying regions of a sample using different orientations of linear polarisation, the method may further increasing the density of information storage available in the label. Similarly, left and/or right elliptical polarisation may also be used, as another degree of freedom so that the information in the label may comprise a base system which is greater than base 4. For example, by using left circularly polarised light, right circularly polarised light, horizontal linearly polarised light and vertical linearly polarised light, each region of the sample may have one of five predetermined properties (including un-modified).

The method may comprise defining the label as a portion of the material, and leaving unmodified at least a portion of the label. In this way, part of the label may have an optical activity that is the same under all types of polarisation. This can serve as a reference point within a label against which other optical activity types may be compared.

The method may comprise defining the label as an array of addressable locations within a portion of the material and predetermining for each location an optical property. The optical property may be the optical property of the unmodified sample (so that that point need not be modified) or may be that of any of the types of laser modified regions.

The array may be a multi-dimensional, regular array of modified regions, or may be a multi-dimensional, irregular array of modified regions. For example, the array may be a two-dimensional square or rectangular array, and each location within the array may be assigned a type of optical property. The modified regions may form pixels of the covert information in their own right, or they may be arranged as groups which collectively make up a pixel. The method may comprise writing an array in which the laser modified regions are coplanar (i.e. all on a flat plane within the sample). The plane of the array may be at a uniform depth beneath a surface of the sample, or may be at the surface of the sample. The array may be a three-dimensional array so that laser modified regions are disposed at varying depths within the sample. The method may comprise modifying the sample in accordance with predetermined characteristics of the label.

The laser modifying may comprise simultaneously modifying a plurality of regions of the material to provide laser modified regions of the first type. Thus, multiple spatially separated laser modified regions of the first type may be created at once. The method may comprise laser modifying a plurality of regions simultaneously, each region being any one of the above described types. Laser modification of a second type of region may be simultaneous with that of a first type. Laser modification of a third type may be simultaneous with that of the first type and/or the second type. The method may comprise laser modifying a plurality of regions and may comprise simultaneously laser modifying the plurality of regions using the first, second and/or third polarisations of light, or may include simultaneously laser modifying a subset of the plurality of regions.

The method may therefore comprise simultaneously creating all laser modified regions of the label having optical activity characteristic of having been formed by light of the first polarisation, and may subsequently or simultaneously comprise creating all regions having optical activity characteristic of having been formed by light of the second polarisation, and may subsequently or simultaneously comprise creating all regions having optical activity characteristic of having been formed by light of the third polarisation. The method may comprise simultaneously modifying (i) a first plurality of regions using light of the first polarisation and (ii) a second plurality of regions using light of the second polarisation. The method may further comprise modifying, simultaneously with the first and second pluralities of regions, a third plurality of regions using light of the third polarisation.

The laser modifying may comprise creating chiral structures within the material. The chiral structures may be formed of molecular and/or crystallite fragments and/or chiral fragments of the material, and their chirality may arise because of the spatial arrangement between the constituent fragments of the structure. The method may comprise creating left-handed chiral structures within the material using left circularly polarised light, and/or may comprise creating right-handed chiral structures within the material using right circularly polarised light.

The method may comprise providing a plurality of laser modified regions proximate one another to create a visible pixel. The method may therefore be used to create a visible mark or pixel within the material which is larger than the constituent laser modified regions by grouping the modified regions sufficiently closely. Each laser modified region may therefore contribute to a portion of a pixel, and groups of laser modified regions may form a single pixel. The pixels may be more easily identified for reading the label and the covert information.

The method may comprise modifying regions of the material within the label using light of a first polarisation state and a first wavelength, and modifying regions of the material within the label using light of a first polarisation state and a second wavelength. Then, modified regions of the first type and first wavelength may be distinguished from modified regions of the first type and second wavelength, by their having different peaks in their respective response signals when read using the different wavelengths. Each of the first, second, and third type of modified regions may be formed using light of the respective polarisation state and a plurality of wavelengths, so as to allow types of modified regions to be distinguished from those of the same (polarisation) type but different wavelength.

The laser pulse may have a duration of between 1 femtosecond and 20 nanoseconds, between 5 and 15 nanoseconds, and may be about 10 nanoseconds. The pulse may have a duration of less than 10 nanoseconds. The pulse duration may be measured by its full width at half maximum (FWHM). Laser modification may comprise a single laser pulse exposure, or may comprise multiple pulse exposures of a single region. Laser modification may comprise any suitable number of exposures, for example between 1 and 100,000 exposures, preferably between 1 and 1000 exposures, and more preferably between 10 and 100 exposures.

The method may comprise writing a barcode, and may comprise writing a covert barcode. The method may comprise writing a QR code, and may comprise writing a covert QR code. The method may comprise writing a unique identifier.

The label may be below an outer surface of the sample and hence may be within the sample. The sample may have any suitable thickness, and may preferably be less than 100 micrometres in thickness, and more preferably may be between 20 and 60 micrometres in thickness.

The laser modified regions may be written with spacing of more than 10 micrometres therebetween. The laser modified regions may be greater than 20 micrometres apart, 50 micrometres apart, 100 micrometres apart, 250 micrometres apart, 500 micrometres apart, and/or 1000 micrometres apart.

The steps of the method may be carried out in any suitable order, and may be carried out in the order recited in the claim, or may be carried out in another order.

According to a second aspect of the present invention there is provided a labelling system for writing a label within a sample of a material, the label comprising a visible layout of light-modified regions in a predetermined spatial arrangement, the system comprising: a light source for modifying regions of the sample using light; and a polarisation apparatus for imparting any one of a plurality of polarisation states to the light for modifying the regions of the sample.

The light source may be any suitable light source, for example a lamp such as a xenon lamp or a tungsten lamp. The light source may preferably be a laser for modifying regions of the sample using laser pulses.

The method may comprise using light of any suitable wavelength to modify the sample. The light may have a wavelength between ultraviolet and infrared.

The polarisation apparatus may be operable to impart any one of all of the polarisation states at different times, and may be controlled to impart a predetermined one polarisation state to the laser pulses.

The labelling system may further comprise: a beam splitting device for dividing the laser into a plurality of laser beams, each laser beam for simultaneously laser modifying a respective region of the sample; and the polarisation apparatus may comprise a plurality of polarisers each arranged for simultaneously polarising a respective one of each of the plurality of laser beams.

The polarisation apparatus may impart the same polarisation for all of the plurality of laser beams simultaneously, or may impart different polarisations to each beam respectively. The polarisations may be any of the polarisations described above with respect to the first aspect of the invention. The labelling system may generate LCP beams, RCP beams, and LP beams for writing as needed. It may further be configured to generate different orientations of LP beam such as vertical, and/or horizontal, and/or any angle therebetween.

Each of the plurality of polarisers may comprise a linearly polarising element for imparting linear polarisation to a laser beam and a circularly polarising element for imparting circular polarisation to a laser beam. The circular polarising element may be a quarter wave plate retarder. The polarisation apparatus may comprise two circularly polarising elements, one for each chirality of polarisation. The circularly polarising element may be actuable to change the chirality of the circular polarisation imparted to the laser beam. The circular polarising element(s) may be operable to polarise a respective laser beam or may be operable not to polarise a beam (e.g. by being moved from the beam path).

The labelling system may comprise a plurality of shutters each operable to block a respective one of the plurality of laser beams. Thus, the system may allow a region of the label to remain unmodified.

Alternatively the system may comprise a plurality of shutters and a single linear and circular polariser, so that all beams are simultaneously polarised with the same polarisation state, and the shutters may be operable to block the beams as necessary so that only those needed for writing that present polarisation are allowed to reach the sample and modify a region thereof. A label could then be written in e.g. three steps, one for each type of polarisation used (unmodified regions would not require a writing step).

The labelling system may comprising focusing optics arranged to focus each of the plurality of laser beams at a respective predetermined location within the sample for laser modifying a respective regions of the sample and writing the label. The focusing optics may be common to each of the plurality of laser beams, or may comprise a plurality of separate focusing mechanisms for each of the laser beams respectively. The focusing optics may be dynamic so that the location of the laser modified regions may be controlled. Alternatively, the focusing optics may be static and the system may comprise a translation stage to move the sample relative to the location of the modifying laser beams' foci.

The plurality of laser beams may be arranged to write in the sample along a straight line. The label to be written may comprise a two dimensional array having one dimension equal to the number of modifying laser beams so that one row/column of the array may be written all at once. The plurality of laser beams may be arranged to write in the sample in a two-dimensional array. There may be as many laser beams as elements of the array, so that an array may be written all at once.

The light source may be arranged to provide a plurality of different wavelengths of light. Thus, the system may be operable to create light-modified regions of each type using different wavelengths, so as to allow the same types of modified region to be distinguished from each other and further increase the available density of information in the label.

The light source of the labelling system, for example, a laser may have a pulse duration between 1 femtosecond and 20 nanoseconds, and may have a pulse duration of between 5 and 15 nanosecond, and may be about 10 nanoseconds for modifying a sample. The pulse duration may be less than 10 nanoseconds. The pulse duration for modification may be determined by the sample material.

The system may further comprise a controller for predetermining properties of the label to include a plurality of optically active laser modified regions and their locations within the label.

The labelling system may be arranged to perform the method according to any of the embodiments of the invention as described with reference to the first aspect.

According to a third aspect of the invention there is provided a sample comprising a label, wherein the label displays a visible layout of light-modified regions in a predetermined spatial arrangement and comprises: a first light-modified region of a first type which has been modified using light of a first polarisation state and has a first optical activity state characteristic of having been formed by light of the first polarisation state.

The sample may comprise a second light-modified region of a second type which has been modified using light of a second polarisation state and has a second optical activity state characteristic of having been formed by light of the second polarisation state. The sample may comprise a third light-modified region of a third type which has been modified using light of a third polarisation state and has a third optical activity state characteristic of having been formed by light of the third polarisation state.

The light-modified regions may be laser-modified regions formed by laser pulses having the appropriate polarisation state.

The sample may comprise a plurality of laser modified regions of the first type which have been modified using light of the first polarisation state and which have a first optical activity state characteristic of having been formed by light of the first polarisation state.

The arrangement of the types of laser modified regions with the sample may encode covert information readable by their characteristic sculpted optical activity.

The sample may comprise a plurality of laser modified regions of the second type which have been modified using light of the second polarisation state and which have a second optical activity state characteristic of having been formed by light of the second polarisation state. The sample may comprising a plurality of laser modified regions of the third type which have been modified using light of the third polarisation state and which have a third optical activity state characteristic of having been formed by light of the third polarisation state.

The laser modified regions may be coplanar within the sample (i.e. all disposed on the same flat plane within the sample). The plane may be parallel to a surface of the sample. The modified regions may be disposed in a two dimensional array, or may be disposed along a straight line.

The modified regions within the sample may be separated by unmodified regions of the sample and may be separated by more than 5 microns, or by more than 20 microns, or more than 200 microns. The label may be less than 50 millimetres in size, and may be less than 10 millimetres, and may be less than 3 millimetres in size.

The sample may be a sample with a label written therein by the method as described in any embodiment of the first aspect of the invention. The label may be written using the labelling system as described above with relation to any embodiment of the second aspect of the invention.

According to a fourth aspect of the present invention there is provided a method of reading a label within a sample, the label comprising a plurality of light-modified regions having a predetermined spatial arrangement therebetween, the modified regions comprising light-modified regions of a first type having a first optical activity state characteristic of having been formed by light of a first polarisation state, the method comprising: illuminating the label with light of a predetermined polarisation state to reveal the locations of the first type of light-modified regions to read covert information encoded by their locations.

The modified regions may comprises light-modified regions of a second type having a second optical activity state characteristic of having been formed by light of a second polarisation state, and the method may comprise:

illuminating the label with light of the predetermined polarisation state to reveal the locations the second type of modified regions to read covert information encoded by their locations.

The label may comprise a third type of modified regions having a third optical activity state characteristic of having been formed by light of a third polarisation state, and the method may comprising: illuminating the label with light of the predetermined polarisation state to reveal the locations the third type of laser modified regions to read covert information encoded by their locations.

The method may comprise illuminating the second type of light-modified region with the same polarity of light as that used to illuminate the first type of light-modified region. The method may include illuminating the third type of light-modified regions with the same polarisation of light as the first type and second type of light-modified regions. For example, for left and right polarised laser modified regions the chirality of the region may be determined using both right polarised light and left polarised light, depending on whether the label is reflecting or transmitting the illuminating light when being viewed.

The light-modified regions of the label may be laser-modified regions created by laser pulses having the relevant polarisation state.

The method may comprise: illuminating the label with light of a second polarisation state to reveal the locations the second type of laser modified regions to read covert information encoded by their locations. The method may further comprise illuminating the label with light of a third polarisation state to reveal the locations the third type of laser modified regions to read covert information encoded by their locations. Since each type of laser modified region exhibits optical activity characteristic of the polarisation state used to create the modified region, the method may comprise illuminating the label with each of the types of polarisation state used to create each of the types of laser modified regions in order to reveal covert information encoded by the locations of the respective types of laser modified regions.

The method may comprise revealing covert information by illumination of the label by a particular polarisation of light.

The method may comprise: alternately illuminating a laser modified region of the label with a pulse of light of a first polarisation state and a pulse of light of a second polarisation state; timing detection of the illuminating light, for a first predetermined period, so as to detect only light of the first polarisation state; timing detection of the illuminating light, for a second predetermined period, so as to detect only light of the second polarisation state; and comparing signals detected in the first predetermined period and the second predetermined period to determine the type of the laser modified region. That is, the method may comprise a type of dichroism measurement to generate a relative signal response over the label to reveal LCP light modified regions, RCP light modified regions, and LP light modified regions.

The method may comprise reading covert information in a label written by any of the embodiments described with respect to the first aspect of the invention. The method may comprise reading covert information written into a label using the system of any of the embodiments described with respect to the second aspect of the invention. The method may comprise reading a label in a sample of any of the embodiments as described with respect to the third aspect of the invention.

The method may comprise using different wavelengths of light to illuminate the label, and may comprise determining the location of types of modified regions of a predetermined wavelength.

According to a fifth aspect of the present invention there is provided a label reader apparatus for reading a label in a sample, the label displaying a visible layout of light-modified regions in a predetermined spatial arrangement, and comprising light-modified regions of a first type having a first optical activity state characteristic of having been formed by light of a first polarisation state, the apparatus comprising: an illumination device for illuminating the label in the sample; a polarisation device for imparting one of a plurality of polarisation states to the illuminating light; a detection device arranged to detect light from the illumination device; and a processor configured to determine from the detected light locations of the first type of modified regions and read covert information encoded by their locations.

The illumination device may be arranged to illuminate only part of the label at a time. The illumination device may be arranged to illuminate the whole label all at once. Where the label is an array, the reader apparatus may be arranged to read one element of the array at each time and scan over the entire array to read the whole label. Alternatively, the reader apparatus may be arranged to illuminate the whole array all at once.

The label reader apparatus may be arranged to read covert information from a label written according to any embodiment of the first aspect of the invention. The label reader apparatus may be arranged to read covert information written in a label using a system according to any embodiment of the second aspect of the invention. The label reader apparatus may be arranged to read covert information from a label in a sample according to any embodiment of the third aspect of the invention. The label reader apparatus may be arranged to read covert information from a label of a sample using the method of any embodiment of the fourth aspect of the invention.

According to another aspect of the present invention there is provided a system for writing a label and reading a label, comprising a labelling system as described with respect to the second aspect, and a label reader apparatus as described with respect to the fifth aspect.

According to another aspect of the present invention there is provided a computer-readable storage medium comprising instructions which, when executed by a computer, cause the computer to perform the method as described with respect to the first aspect, or the method as described with respect to the fourth aspect.

According to another aspect of the present invention there is provided a method of encoding information including inputting information into a processor that is to be assigned to a label, encoding the information on the processor as covert information to be hidden in a spatial arrangement of different types of chirality or optical activity states at different addressable locations in an array of laser modified regions in a material that is to form the label, outputting a signal for a laser writing apparatus to control the output of a laser between different output modes comprising at least left-circularly polarised light, right circularly polarised light, and linearly polarised light (e.g. vertical and/or horizontal and/or any other tilted orientation between 0 degrees (vertical) and 90 degrees (horizontal)) to induce different types of laser modification at different locations of the label to write the covert information within a visual layout of laser modified regions.

LIST OF FIGURES

Figure 3:
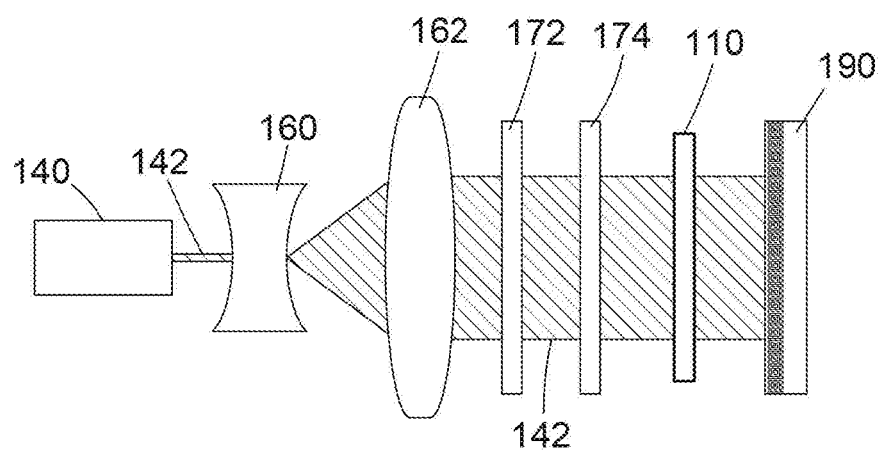
Figure 4:
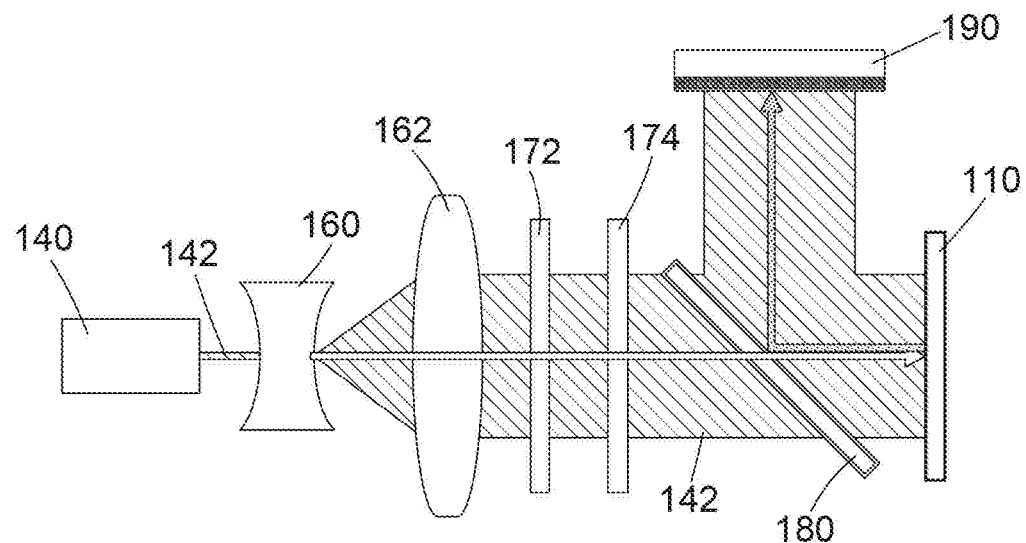
Figure 5:
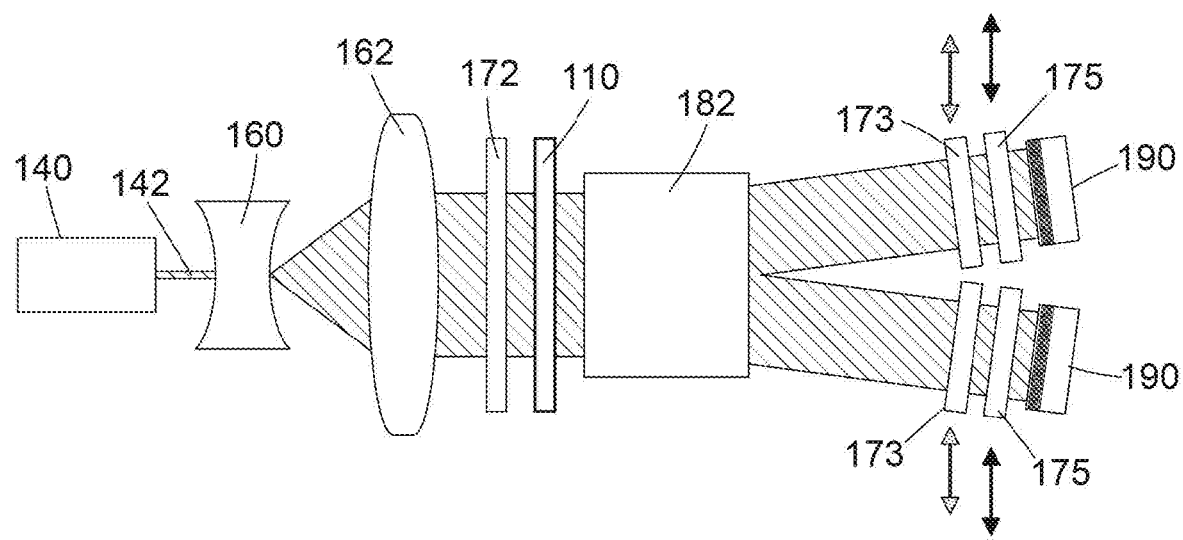
Figure 6:
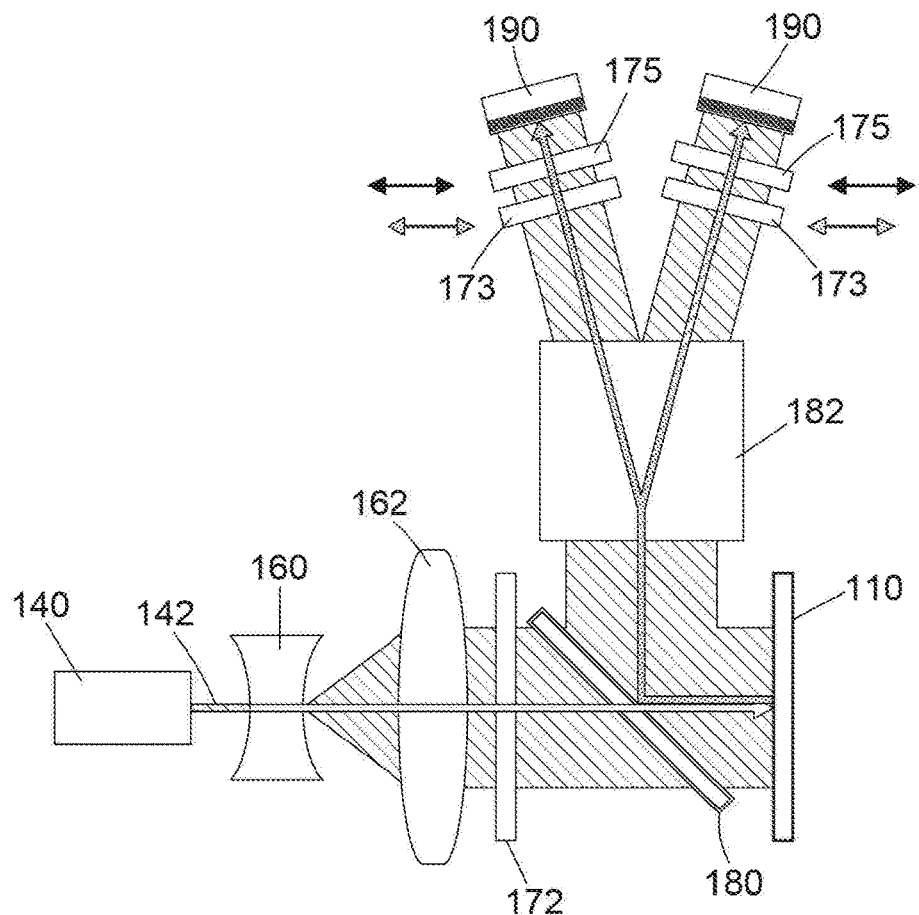
Figure 7:
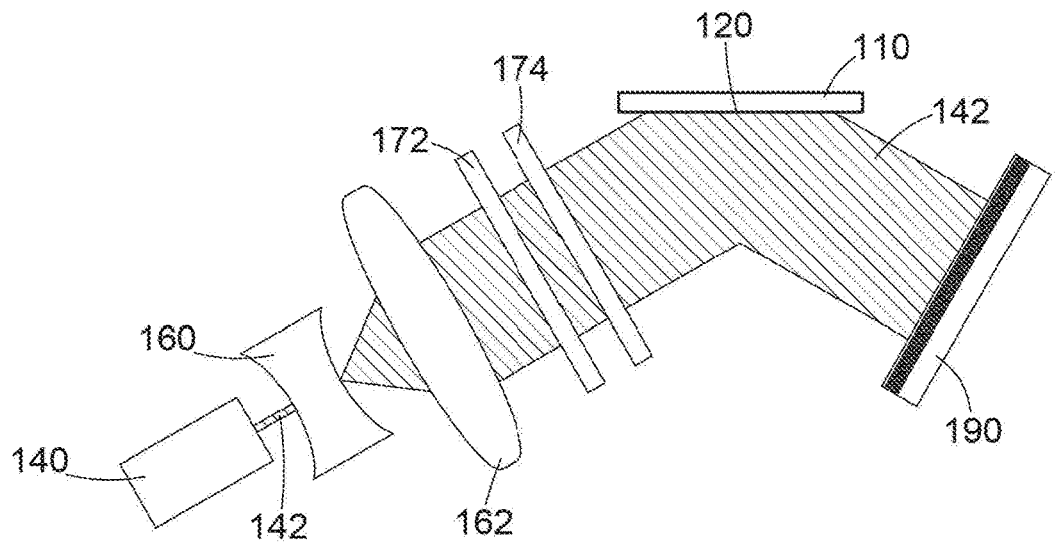
Figure 10:
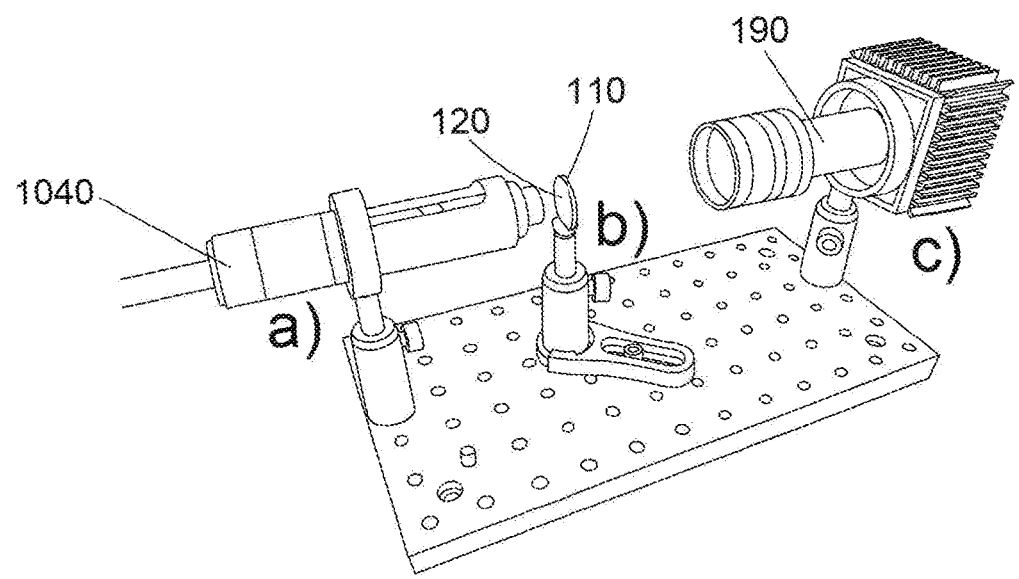
Figure 11:
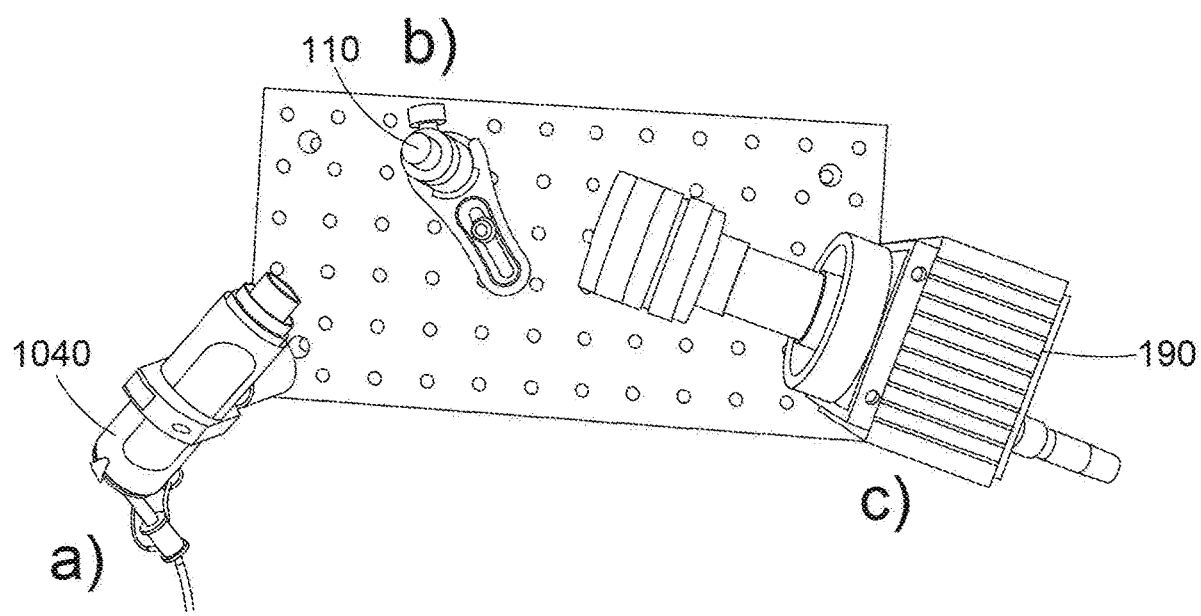

Certain preferred embodiments of the invention will now be described by way of example only and with reference to the accompanying drawings in which:

FIG. 1A shows a schematic of a label in a sample;
FIG. 1B shows an implementation of the schematic of FIG. 1A;
FIG. 1C shows a magnification of the label of FIG. 1B;
FIG. 1D shows the results of dichroism measurements of the label of FIG. 1C;
FIG. 2 shows a labelling system for writing a label in a sample;
FIG. 3 shows a label reading system;
FIG. 4 shows another label reading system;
FIG. 5 shows another label reading system;
FIG. 6 shows another label reading system;
FIG. 7 shows another label reading system;
FIG. 8A shows a schematic of a label in a sample;
FIG. 8B shows an implementation of the schematic of FIG. 8A;
FIG. 8C shows the implementation of FIG. 8B as a difference between illumination of the label under left circularly polarised light and right circularly polarised light;
FIG. 8D shows the results of dichroism measurements of the label of FIGS. 8B and 8C;
FIG. 9A shows a schematic of a label comprising four types of laser modified region;
FIG. 9B shows an implementation of the schematic of FIG. 9A;
FIG. 9C shows the implementation of FIG. 9B as a difference between illumination of the label under left circularly polarised light and right circularly polarised light;
FIG. 9D shows the results of dichroism measurements of the label of FIGS. 9B and 9C;
FIG. 10 shows a transmission-type label reading system; and
FIG. 11 shows a reflection-type label reading system.

DETAILED DESCRIPTION

An application of the invention may relate to photo-induced optical activity in pure and doped $Ge_2Sb_2Te_5$ (GST) thin films in security labels, in which there are overt (visible) and covert (invisible) features that provide increased security. The labels may be individualised with never-repeating code or an individual number may be encoded, if needed. The overt (visible) features are provided by changing the originally amorphous GST film into crystalline or photo-darkened form by laser light illumination. The covert (invisible) features are defined by using different states of polarisation of laser light that may be used to change the state of the amorphous film to a crystalline form comprising either an enantiometric excess of a chiral species, for example a left or right enantiomer, or a racemic mixture where there is no bias. Three different polarisation states of laser light may be used to write the covert features, such as left circular polarisation, right circular polarisation, and linear polarisation.

The invention may relate to a method to encode an individual number/image in a label. The label may be written by using overt and covert features and may have a form of e.g. an N×N matrix array, in which each position within the array can be either an area of the original as-deposited amorphous GST film, or a dot on the amorphous GST film that has been treated by a laser light. Each position in the matrix may be assigned a number, for example, starting from the left top corner, and going from left to right and from top to bottom. For example, the top left position may be assigned number 1, and the bottom right position may be number $N^2$. The positions may be the powers of the quaternary numeral system. Such a matrix may be used to encode numbers which may be individual for each of the security label using the overt and covert features described above.

Using these features, four bits of information may be defined as follows: original as-deposited amorphous area may be 1, laser-treated area using left circularly polarised light may be 2, laser-treated area using right circularly polarised light may be 3, and laser-treated area using linearly polarised light may be 4. The matrix may then be used to record a number of up to $4^{(N[<]BEGINITALm2)}$ (i.e. 4 to the power of N squared), meaning that $4^{(N[<]BEGINITALm2)}$ individual labels may be prepared. For example, a matrix of 6×6 dots may be enough to put more than 500 different labels on every grain of sand on Earth (assuming there are $7.5 \times 10^{18}$ grains of sand). Using the size of the spot of 500 microns, the size of the whole label may be about only 3×3 millimetres. The correct number of the label may only be revealed if the covert features are correctly read.

The number may be further encoded by a secret key number to further increase the security. An example is described below. Suppose the number to be put in the label is 1 in decimal base. If it is converted into quaternary base—1—to be put in the label, the size of the number is easily recognised as just a single dot used to represent it. If the secret key number is 123 (decimal), the input number may be converted using some encryption method, for example, bitwise XOR encryption into 1 XOR 123=122 (decimal). This may be converted into base 4 numerical value—2433—which may then be written as the label array—LCPL LPL RCPL RCPL. The reading may occur by reversing the above encoding operation. First, the encoded base 4 number may be read. Then the corresponding decimal value may be converted into encoded number by using the secret key and binary XOR operation: 122 XOR 123=1.

As an alternative or in addition to the label design, a bar code may be written using the technology, within which a covert QR code may be encoded by using the polarisation of light, as shown by the demonstration label in FIG. 1.

The invention may relate to a label writing device. The writing device may include a pulsed laser and a writing head, where a single beam from a laser may be split into multiple laser beams arranged in a required N×N array by using suitable optical cables. Each of the beams in the writing head may be fitted with its own controlled polariser and quarter wave plate to prepare any of the required polarisations—left circular, right circular, or linear. The beams may then be focused on to the required size on the GST material for writing. The laser beam may have a circular or a square shape and may have a Gaussian or top hat profile.

The invention may relate to a reading device. The reading device may examine differential light absorption of left and right circularly polarised light at a given wavelength in the area where the authenticity label is written. The device may consist of a continuous laser that produces a narrow light beam for illumination of only small area equivalent to the size of the written dot in the label. The beam may be passed through a photoelastic modulator or Pockels cell or Soleil-Babinet compensator or the like to prepare alternating pulses of left and right circularly polarised light that may then be scanned through the label. A photomultiplier single beam detector may be behind the label and may be timed to record only pulses of light with left or right circular polarisation. The read signals as a function of position on the label may then be converted into an image or a number using the algorithm such as the one described above.

An alternative design of the reading device may use a wide beam illumination of the laser that can illuminate the whole label. The light beam may again be passed through a photoelastic modulator or Pockels cell or Soleil-Babinet compensator to prepare alternating pulses of left and right circularly polarised light. These pulses may be passed through the label and the signal may be recorded by a pixelated detector, for example, a photo diode or avalanche photo diode array.

The design of a reading device that will allow fast reading of the suggested security labels may be based on a laser polarimeter design. In this design, a laser beam of the wavelength that has shown to produce the largest response in the CD spectra, in this case in the range of 500 to 560 nanometres (nm), more preferably 515 to 545 nm, for example 532 nm, may be used. A linearly polarised light from a small beam of the laser may be used to scan the area of the label. The polarisation rotation may then be measured by a set of polarises and a detector. In these measurements the exact angle of polarisation rotation of light passing through the label may not be important, only the direction of rotation—left or right or no rotation—may be used to reveal the covert information in the label.

Different wavelengths of light may be used to write the spots in the same pattern to provide an additional parameter to store information. Such a spot can be distinguished from another spot written with another wavelength of light. For example, if 532 nanometres (nm) green light (G) is used with left (L) or right (R) circular polarisation (CP) to write a spot, when reading, it will give a response signal peaked at also 532 nm. If 266 nm blue laser (B) is used with left (L) or right (R) circular polarisation (CP), it gives a response peaked around 266 nm. Linearly polarised light may give indistinguishable signals with respect to the inducing light's wavelength. So in case of left and right circularly polarised light and one direction of linearly polarised (LP) light, it gives an opportunity to write information with increased density. For example, BLCP, BRCP, GLCP, GRCP and BGLP spots. In addition, adding different directions of linear polarisation may further increase information density and hence security of the label. When the label is read, it can be read by blue light, green light or any suitable wavelength, and therefore the different spots can be distinguished.

Embodiments of the invention may be used for manufacturing and authentication of security labels for various products. An advantage of the invention may be a combination of high security and simplicity of manufacturing of individualised labels. Existing technology typically relies on e-beam lithography to write ever decreasing features in a metal matrix often down to several tens of nanometres, which are difficult to reproduce reliably during large scale production. In addition, the e-beam technique cannot be easily used to individualise the labels. The disclosed technique may be secure, because it may use several levels of encryption, and may be easy to adapt to large scale manufacturing of labels each of which may be unique.

The disclosed method may comprise any of the following features. It may comprise use of chalcogenide materials to increase the security level of authenticity labels. The disclosed method may comprise storing and reading individual number/information in the labels using polarisation of light.

The invention will now be described in more detail with reference to an exemplary embodiment. Chiral light may be used, such as left or right circularly polarised light, to crystallise amorphous films of $Ge_2Sb_2Te_5$. The treated regions of the film become chiral, depending on the chirality of the light used to crystallise the film. This may manifest in pronounced mirror-symmetric circular dichroism spectra recorded from the areas treated by light of opposite chirality, namely left and right circularly polarised light. The mechanism of this phenomenon is suggested to be that as the light induces crystallisation in the film, the growing crystallites are aligned in the material along rotating polarisation vectors of the propagating light. Depending on the direction of rotation of the polarisation in the light, chiral left- or right-handed crystallite groups are formed, and preserved in the material. These chiral crystallite groups may then produce the chiral response when circular dichroism spectra are measured.

FIG. 1A shows a label design as a covert QR code within a visible bar code. FIG. 1B shows its implementation in a sample of GST film on a LiF substrate disk. FIG. 1C shows an enlarged bar code in visible light, and FIG. 1D shows the QR code revealed by circular dichroism measurements. As can be seen from FIG. 1D, the label can be read using chiral illumination and a hidden QR code represented by the chirality of the spots induced by chiral illumination.

EXAMPLES

FIG. 1A is a schematic view of an exemplary label 120 in a sample 110. The label 120 is made of an array of laser modified regions 130 in the form of dots. Each laser modified region 130 is modified by left circularly polarised light, right circularly polarised light, or linearly polarised light (e.g. vertical, horizontal, and/or tilted). Left circularly polarised modified regions 132 are shown all the same colouring, as are right circularly polarised modified regions 134, as are linearly polarised modified regions 136. The label 120 also includes spaces 138 formed by unmodified regions of the sample 110. The label 120 shown in FIG. 1A comprises several columns of modified regions 130, but it will be appreciated that any suitable array or shape can be formed by the modified regions.

FIG. 1B shows an implementation of the schematic of FIG. 1A. The sample 110 is a $Ge_2Sb_2Te_5$ (GST) film carried on a lithium fluoride (LiF) disc. The label 120 is defined within a predetermined region of the sample 110. In this example, a total of 90 spots, each of about 500 micrometres in diameter, are distributed in a 10×9 grid in a 8 mm×5 mm area. FIG. 1C shows an enlargement of the label 120 of FIG. 1B under visible light (i.e. unpolarised light). As can be seen from FIG. 1C, all of the laser modified regions 130 appear to be substantially the same, showing as dots within the sample 110. The spaces 138 do not show any modification as compared to the sample 110. The label therefore displays a visible layout of laser modified regions in a predetermined spatial arrangement. The spatial arrangement comprises laser modified regions separated by unmodified regions in a predetermined way.

The left circularly polarised modified regions 132 formed by light of left circular polarisation have a first type of optical activity when measured e.g. using a circular dichroism (CD) instrument. During formation of the laser modified region, molecular fragments of the material align under the electromagnetic field of the modifying light and so the material takes on a left handed chirality. As such, the laser modified regions 132 interact with left circularly polarised light differently to other polarisations. In a similar way, right circularly polarised laser modified regions 134 exhibit optical activity because of a right handed chirality created during formation. Linearly polarised laser modified regions 136 are created by molecular fragments aligning with the linearly polarised electromagnet field of the modifying light, and therefore exhibit optical activity with linearly polarised light of the same orientation as the modifying light. Thus, each laser modified region exhibits optical activity when illuminated by light having the same polarisation as that which created the region.

For example, the left circularly polarised laser modified regions 132 have a first type of optical activity. They exhibit increased transmission of left circularly polarised light, and an increased reflection of right circularly polarised light. Right circularly polarised laser modified regions 134 have a second type of optical activity. They exhibit increased transmission of right circularly polarised light, and an increased reflection of left circularly polarised light. Linearly polarised laser modified regions 136 have a third type of optical activity. They exhibit increased transmission in transmission mode (see e.g. FIGS. 3 and 5) and increased reflection in reflection mode (see e.g. FIGS. 4 and 6) of linearly polarised light of the same orientation (e.g. vertical, horizontal, and/or tilted), and a decreased transmission in transmission mode (see e.g. FIGS. 3 and 5) and a decreased reflection in reflection mode (see e.g. FIGS. 4 and 6) of other polarisations It is therefore possible to distinguish types of laser modified regions by illuminating them with light of a particular polarisation.

FIG. 1D shows the label of FIG. 1C as revealed by circular dichroism measurements using Diamond B23 beamline for synchrotron radiation circular dichroism imaging with highly collimated microbeam to achieve high spatial resolution. Such measurements comprise sequential illumination under left circularly polarised light and right circularly polarised light. A ratio of the results under each type of illumination is taken to form a ratio of signals and show their relative strengths (intensity magnitude). The left circularly polarised modified regions 132 all appear, shown in the same colouring, where the signal strength for left circularly polarised light is stronger than that of right circularly polarised light. The right circularly polarised modified regions 134 all appear shown in another colouring, all the same, in regions where the signal strength is greater for right circularly polarised light than for left circularly polarised light. The optical activity and behaviour of the laser modified regions is therefore revealed. Not all of the laser modified regions 130 appear in this depicted case, since some regions behave the same under both left and right circularly polarised illumination. The linearly polarised modified regions 136 do not appear in FIG. 1D. Similarly, the spaces 138 do not show any activity since they behave the same way for both left and right circularly polarised light, and hence do not create a difference in signals. Thus, the left circularly polarised modified regions 132 can be differentiated from the right circularly polarised modified regions 134, which in turn can be differentiated from the linearly polarised modified regions and unmodified regions. Hence, a spatial arrangement that was not otherwise visible may be revealed.

Although an exemplary array is shown in FIGS. 1A-D, it will be appreciated that the laser modified regions 130, 132, 134 and 136, together with the spaces 138 can be arranged in any suitable manner, with any suitable spacing therebetween. For example, a square array of modified regions 130 may be written which under visible light would appear to comprise identical dots regularly spaced, but which under circular dichroism measurements, or under illumination by a particular polarisation of light, could reveal a covert pattern. Another covert pattern may be revealed by measurements under linear polarisation to reveal the linearly polarised modified regions 136. Moreover, the relative orientation of the linear polarisation used to create the laser modified region may also be distinguishable. Therefore, laser modified regions created by different orientations of linear polarisation (e.g. vertical, horizontal, tilted) may also be distinguished from each other.

Although FIG. 1D shows the results of circular dichroism measurements (i.e. a difference in signals for different polarisation), the optical activity states of a laser modified region may be revealed by illuminating the label 120 with light of a single polarisation. For example, left circularly polarised laser modified regions 132 will have an increased reflection of right circularly polarised light. As such, they may be revealed by illumination under right circularly polarised light and observation of the increase in reflected light. Alternatively, they might be revealed by transmission of left circularly polarised light. It is therefore possible to reveal covert arrangements of laser modified regions by illuminating the label with light of a predetermined polarisation.

The array of FIG. 1 is a two-dimensional orthogonal arrangement in Cartesian co-ordinates. However, the label 120 need not be arranged on Cartesian orthogonal axes but could be based on any coordinate system which is able to provide addressable regions.

As another example, an array may be written using modified regions 130 and spaces 138 to create a label 120 comprising standard QR code when viewed under visible light. Measurements of the label 120 using suitable polarisations may then reveal an otherwise hidden array and pattern of modified regions. It may further reveal another covert pattern under illumination of another polarisation.

The label 120 may be written in any suitable material, and may be written in a phase change material. The material may be a chalcogenide material. Non-limiting examples of chalcogenide materials include Ge—Sb—Te (GST), As—Sb—Te, As—Ge—Sb—Te, Sn—Sb—Te, In—Sb—Te, Ag—In—Sb—Te, Ge—Te, In—Se, Sb—Te, Ga—Sb, In—Sb, As—Te, Al—Te, Ge—Sb—Te, Te—Ge—As, In—Sb—Te, Te—Sn—Se, Ge—Se—Ga, Bi—Se—Sb, Ga—Se—Te, Sn—Sb—Te, In—Sb—Ge, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Sb—Se—Te, Ge—Sn—Sb—Te, Ge—Te—Sn—Ni, Ge—Te—Sn—Pd and Ge—Te—Sn—Pt. It will be appreciated that the hyphenated chemical composition notation used herein indicates the elements included in a particular mixture or compound, and is intended to represent all stoichiometries involving the indicated elements. Moreover, where chalcogenide compounds having particular stoichiometries are specified, the chalcogenide compound may include the same combination of elements having other stoichiometries.

The material may comprise Ge, Sb and Te. The material may comprise one or more dopants. The one or more dopants may be selected from Ag, Au, B, C, N, O, Al, Si, P, S, Ga, Se, In, Sn, I, Pb and Bi. The material may comprise one or more dopants, at least one of which is N.

The material may be a chalcogenide material comprising Ge, Sb, Te and one or more dopants. The one or more dopants may be selected from Ag, Au, B, C, N, O, Al, Si, P, S, Ga, Se, In, Sn, I, Pb and Bi. The material may comprise one or more dopants, at least one of which is N.

The material may comprise Ge, Te and Sb in the following amounts (in atomic percent): from about 5% to about 60% Ge; from about 20% to about 70% Te; and from about 5% to about 30% of one or more dopants; with the remainder being Sb (e.g. from about 5% to about 60% Sb). The atomic percentage of Ge in the material may be from about 15% to about 50%, e.g. from about 17% to about 44%, e.g. about 22%. The atomic percentage of Sb in the material may be from about 15% to about 50%, e.g. from about 17% to about 44%, e.g. about 22%. The atomic percentage of Te in the material may be from about 23% to about 56%, e.g. from about 48% to about 56%, e.g. about 55%. Ge, Sb and Te may be present in atomic percentages of about 22%, about 22% and about 55% respectively.

The phase change material may comprise a chalcogenide compound of the formula $Ge_2Sb_2Te_5X_n$, wherein X represents one or more dopants and n is from about 0.1 to about 2. X may represent one or more dopants selected from Ag, Au, B, C, N, O, Al, Si, P, S, Ga, Se, In, Sn, I, Pb and Bi. X may be N. The value n may be from about 1 to about 2, e.g. about 1 or about 2.

The phase change material may be produced in accordance with various techniques known in the art. For instance, the phase change material may be produced by vapour deposition on a suitable substrate. Suitable deposition techniques include physical vapour deposition (PVD), chemical vapour deposition (CVD). Physical vapour deposition techniques include sputtering, evaporation and ionized deposition techniques.

The material may be formed as a layer of material. The layer may have a thickness ranging from about 40 to about 1000 nm, e.g. from about 60 to 100 nm, or from about 200 to about 300 nm.

The material may be formed as a layer on a substrate. The substrate may be a silicon substrate or another bulk substrate including polymer or a layer of semiconductor material. For example, the substrate may be selected from silicon wafers, silicon-on-insulator substrates, silicon-on-sapphire substrates, epitaxial layers of silicon on a base semiconductor foundation, and other semiconductor or optoelectronics materials, such as silicon-germanium, germanium, gallium arsenide, or indium phosphide. The material of the substrate may be doped or undoped. The material may also be formed on another material overlying the substrate, depending on the intended application of the phase change material.

The material may comprise a chiral species. The material may comprise a plurality of chiral species. A chiral species may be a chiral molecule or complex, or a chiral fragment, i.e. a molecular fragment or crystallite cluster which can exist in a plurality of non-superimposable forms.

The material may comprise a dopant which forms one or more chiral species in the material. The material may be doped with nitrogen such that one or more chiral species are formed in the material.

The material may comprise a chiral species containing a nitrogen atom, wherein the nitrogen atom is bound to three different moieties in a substantially non-planar geometry and comprises a lone pair of electrons. The nitrogen atom may be bound to Ge, Sb and Te in a non-planar geometry. The sum of the bond angles about the nitrogen atom may be less than 360°, e.g. from about 320° to about 355°. The sum of the bond angles about the nitrogen atom is about 355°.

FIG. 2 shows a schematic of a labelling system for writing a label in a sample. The system comprises a laser 140 which generates a laser beam 142. The laser beam 142 propagates to defocusing optics 160 which are arranged to divide the laser beam 142 into a plurality of beams 143, 144, 145, 146.

A plurality of optical fibres 150 are arranged to guide each of the plurality of beams 143, 144, 145, 146 to a polarisation apparatus 170. The polarisation apparatus comprises linear polarisers 172 and quarter wave plates 174. The linear polarisers 172 and quarter wave plates 174 may be individually addressable.

As each of the plurality of laser beams 143, 144, 145 146, passes through the polarisation apparatus 170, the desired polarisation state is imparted. The polarisation apparatus 170 comprises elements for each of the beams 143, 144, 145 146 respectively. The elements of the polarisation apparatus 170 are individually addressable and can be controlled so as to polarise each laser beam 143, 144, 145, 146 with the desired polarisation state. For example, the top-most beam 143 may be polarised by the linear polariser 172 to a linear polarisation state (e.g. vertical, horizontal and/or tilted). The quarter wave plate 174 in the path of the top-most beam 143 is not used. The next beam 144 may be polarised by the quarter wave plate 174 to a left circular polarisation state. Beam 145 may be polarised by the quarter wave plate 174 to a right circular polarisation state.

The system may also include blocks or shutters 176 to stop propagation of any and all of the lasers beams 143, 144, 145, 146. For example, shutters 176 may be disposed in the path of each beam 143, 144, 145, 146 and between the polarisation apparatus 170 and the sample 110, or between the optical fibres 150 and the polarisation apparatus 170. The shutters 176 may be operable to stop propagation of a beam and thereby stop formation in the sample 110 of a laser modified region. In this way, spaces 138 may be 'formed' in the label 120.

According to the system of FIG. 2, each beam 143, 144, 145, 146 may be given the desired polarisation state. The beams are then focused by focusing optics 162 into the sample 110. Each beam thus writes a laser modified region 130 within the sample, each laser modified region 130 having an optical property characteristic of having been formed by light of the respective polarisation. Where shutters 176 are included in the system, any of the beams may be prevented from reaching the sample 110 and writing a modified region 130, instead resulting in a space 138 in the label 120.

The system of FIG. 2 comprises four beams 143, 144, 145, 146 for writing modified regions 130. The system may then write four laser modified regions 130 within the sample 110 by each exposure. After an exposure, the sample 110 may be translated so that the next exposure writes laser modified regions 130 in the next location within the sample 110. Alternatively the focusing optics 162 may re-focus each of the beams 143, 144, 145, 146 to another location within the sample 110.

Although four beams are shown in FIG. 2, it will be appreciated that any suitable number may be used. In FIG. 2, the beams are arranged linearly and the written laser modified regions 130 are disposed on a line within the sample 110 and below its surface. However, the beams may be arranged in any suitable manner and the focusing optics may be configured to write each laser modified region 130 in a predetermined location within the sample 110 as needed. The focusing optics 162 may be dynamic and may be controlled to write laser modified regions 130 within the sample 110 as desired or in accordance with a controlling program.

The sample 110 may be labelled in advance of being fixed to a product. For example, the sample 110 may be a sticker that first has a label 120 written therein, then is stuck to a product.

The sample 110 may be a coating applied to a product which then has a label 120 written therein. The sample may be the product itself, so that the label 120 is written directly therein.

FIG. 3 shows a label reading device for a transmission-type reader. The label reading device comprises a laser 140 for generating a laser beam 142, defocusing optics 160 to expand the laser beam 142 to a desired coverage, and focusing optics 162 to collimate the laser beam 142. The collimated beam 142 passes through a linear polariser 172 and a retarder 174 (e.g. a left-handed, right-handed ¼ wave static retarder, Pockels Cell, PEM, motorised Soleil Babinet, etc.) for imparting a left or right circular polarisation to the laser beam 142. The beam 142 is sized to illuminate the whole label 120 within the sample 110. After transmission through the sample 110 and label 120, the beam 142 is incident on a detector 190.

The retarder 174 may be removed from the path of the laser beam in order to illuminate the sample 110 with linearly polarised light. Alternatively, the retarder 174 may be kept in the path of the beam 142 to illuminate the sample 110 with a first circular polarisation of light (e.g. left), and further may be flipped to illuminate the sample 110 with a second type of circular polarisation of light (e.g. right).

The detector 190 detects light transmitted through the sample 110 during use. The signal received at the detector 190 will depend on the polarisation of the light illuminating the sample 110, and on the spatial arrangement and type of laser modified regions 130 within the sample 110. A covert spatial arrangement may be revealed. By comparing the signals received at the detector to the known polarisation of light applied to the sample, the type of laser modified region can be revealed, and a covert arrangement of region types can be revealed.

Optionally, a controller (not shown) may be used to control switching of the retarder 174 to switch circular polarisation illumination of the sample 110 from left to right and vice versa. The controller may also be used in coordinating circular dichroism measurements by timing detection by the detector so as to record only light of a first polarisation for a period of time, then only light of a second polarisation for another period of time. The controller may then compare those measurements to generate e.g. a dichroism measurement as shown in FIG. 1D.

FIG. 4 shows a label reading device for a reflection-type reader. The depicted reader comprises similar elements to those shown in FIG. 3, and further comprises a dichroic mirror 180 arranged so that the laser beam 142 can pass from the laser 140 to the sample 110, then reflect from the dichroic mirror 180 onto the detector 190. Upon reflection from the sample 110, the handedness or the polarisation of the light (e.g. sculpted left circularly polarised light) is flipped to the opposite handedness (e.g. right circularly polarised), which in turn is flipped back to its original polarisation (e.g. left circularly polarised) when reflected by the dichroic mirror 180. The linear polarisations are maintained upon transmission through the dichroic mirror 180 and reflection from the sample 110 and the mirror 180, respectively.

The reader of FIG. 4 may be used to read a label by reflection of different polarisations of light from the label 120 in the sample 110. The reader of FIG. 3 may be used to read a label by transmission of different polarisations of light through the label 120 in the sample 110. In order to increase signal strength, the thickness of the sample 110 may be increased so that the laser modified regions 130 forming the label 120 may be made larger and hence provide a stronger response to light incident thereon. However, increased thickness of the sample 110 may reduce transmission of light therethrough, so a reflection type reader may be used where thicker or non-transparent samples 110 are needed in order to obtain a stronger signal at the detector 190.

FIG. 5 shows a label reading device for a transmission-type reader. The label reading device comprises a light source, for example a laser, 140 for generating a light beam 142, defocusing optics 160 to expand the light beam 142 to a desired coverage, and focusing optics 162 to collimate the light beam 142. The collimated beam 142 passes through a linear polariser 172 and a Fresnel's multi prism (several Cornu quartz prisms) 182, from which two beams, one for left circularly polarised components and the other for right circularly polarised components will exit and will be converted into linear polarised components by a rotating quarter wave retarder 175 from each Fresnel's beam. The beam 142 is sized to illuminate the whole label 120 within the sample 110. After transmission through the sample 110 and label 120, the beam 142 is split by the Fresnel's multi prism 182 into two beams: one for left circularly polarised components and one for right circularly polarised components that, being converted into linear polarisation by rotatable quarter wave retarders 175, are incident on detectors 190.

Both rotatable quarter wave plates 175 may be removed from the path of the laser beam and replaced by rotatable linear polarisers as analysers 173 to image the sculpted linear polarisation (vertical, horizontal or tilted) of label 120 of sample 110.

FIG. 6 shows a label reading device for a reflection-type reader. The depicted reader comprises similar elements to those shown in FIG. 5, and further comprises a dichroic mirror 180 arranged so that the laser beam 142 can pass through from the laser 140 to the sample 110, then reflect from the dichroic mirror 180 onto the Fresnel's multi prism (several Cornu quartz prisms) 182, rotatable quarter wave retarders 175 and detectors 190. The replacement of rotatable quarter wave retarders 175 with linear polarises 173 will identify the linear polarisation components of label 120 when in crossed polarised position with respect to 172.

The reader of FIG. 6 may be used to read a label by reflection of different circular polarisations of light from the label 120 in the sample 110.

FIG. 7 shows a label reading device for a reflection-type reader. The label reading device comprises a laser 140 for generating a laser beam 142, defocusing optics 160 to expand the laser beam 142 to a desired coverage, and focusing optics 162 to collimate the laser beam 142. The collimated beam 142 passes through a linear polariser 172 and a rotatable quarter wave plate 174 for imparting a left or right circular polarisation to the laser beam 142. The beam 142 is incident on the label 120 in the sample 110 and reflects therefrom. After reflection from the sample 110 and label 120, the beam 142 is incident on a detector 190.

The quarter wave plate 174 may be operated (e.g. removed from the path of the laser beam) in order to illuminate the sample 110 with linearly polarised light. Alternatively, the quarter wave plate 174 may be kept in the path of the beam 142 to illuminate the sample 110 with a first circular polarisation of light (e.g. left), and further may be flipped to illuminate the sample 110 with a second type of circular polarisation of light (e.g. right).

The detector 190 detects light reflected from the sample 110 during use. The signal received at the detector 190 will depend on the polarisation of the light illuminating the sample 110, and on the spatial arrangement and type of laser modified regions 130 within the sample 110. A covert spatial arrangement may be revealed by appropriate illumination as described herein. By comparing the signals received at the detector to the known polarisation of light applied to the sample 110 and label 120, the type of laser modified region 130 can be revealed, and a covert arrangement of region types can be revealed.

FIG. 8A is a schematic view of an exemplary label 120 in a sample 110. The label 120 comprises an array of laser modified regions 130. In this case the laser modified regions are dots, but it will be appreciated that any suitably shaped region may be formed by laser modification of a portion of the sample 110. Each laser modified region 130 of the label 120 is formed using left circularly polarised light, right circularly polarised light, or linearly polarised light (e.g. vertical, horizontal, and/or tilted). Left circularly polarised modified regions 132 are shown all in the same colouring, as are right circularly polarised modified regions 134, as are linearly polarised modified regions 136. The label 120 also includes spaces 138 formed by unmodified regions of the sample 110. The label 120 shown in FIG. 8A comprises several columns of laser modified regions 130, but it will be appreciated that any suitable array or shape can be formed by the modified regions 130.

FIG. 8B shows an implementation of the schematic label 120 of FIG. 8A in a sample 110 comprising left circularly polarised modified regions 132 formed by left circularly polarised light, right circularly polarised modified regions 134 formed by right circularly polarised light, and linearly polarised modified regions 136 formed by linearly polarised light. The label of FIG. 8B is read using a scheme according to FIG. 3 and by a reader system as shown in FIG. 10. The label 120 is illuminated under left circularly polarised light and the intensity range of the image is displayed in FIG. 8B. Since the intensity range of the image is shown in FIG. 8B, the laser modified regions 130 therein appear similar to each other.

FIG. 8C shows the difference between two images of the label 120 obtained by the reader of FIGS. 3 and 10 under left and right circularly polarised light illumination. The different polarisations reflect differently from the different types of laser modified regions 130, and therefore comparison of the images under different polarisations (in this case a difference of the images) reveals the different types of laser modified regions 130 and each type of laser modified region 130 is distinguishable from the other. Left circularly polarised modified regions 132 are disclosed corresponding to their locations in the schematic of FIG. 8A. Similarly, right circularly polarised modified regions 134 are revealed, as are linearly polarised modified regions 136. Spaces 138 are also clearly seen as unmodified regions, thereby allowing the modified regions 130 to be seen.

FIG. 8D shows a circular dichroism signal of the label 120 of FIGS. 8A to 8C (with ellipticity in millidegrees). Again the types of laser modified regions 130 are clearly distinguishable from each other and their locations and arrangements are revealed by the measurement.

FIG. 9A shows a schematic of an exemplary label 120 comprising laser modified regions 130 in the form of dots. Each of the four depicted laser modified regions 130 corresponds to a different type of laser modified region. The first (left-most in FIG. 9A) laser modified region 130 is a left circularly polarised modified region 132 formed by left circularly polarised light. The second (second left in FIG. 9A) is a right circularly polarised modified region 134 formed by right circularly polarised light. The third and fourth laser modified regions (the two regions on the right in FIG. 9A) are linearly polarised modified regions 136 formed by linearly polarised light. However, the third modified region is a vertical linearly polarised modified region 137 formed using vertically linearly polarised light, and the forth region (right-most in FIG. 9A) is a horizontal linearly polarised modified region 139 formed using horizontally linearly polarised light.

FIG. 9B shows an implementation of the label 120 of FIG. 9A read using a reader according to the scheme of FIG. 7 and shown in FIG. 11. Similarly to FIG. 8B, FIG. 9B shows the intensity range of the label 120 illuminated with left circularly polarised light. Since the image displays the intensity range, each of the laser modified regions 130 in FIG. 9B appears similar to the others despite being of different types.

FIG. 9C shows a difference between two images of the label obtained by the reader of FIGS. 7 and 11 under left and right circularly polarised light illumination. By comparison of images obtained under illumination by different polarisations (in this case the difference between left circularly polarised illumination and right circularly polarised illumination) the differences between the laser modified regions 130 are revealed and each type of laser modified region 130 is distinguishable from the other. The left circularly polarised modified region 132 is disclosed corresponding to its location in the schematic of FIG. 9A. Similarly, the right circularly polarised modified region 134 is revealed. Moreover, the vertical linearly polarised modified region 137 is distinguished from the horizontal linearly polarised modified region 139.

FIG. 9D shows a circular dichroism signal of the label 120 of FIGS. 9A to 9C (with ellipticity in millidegrees). Again the types of laser modified regions 130 are clearly distinguishable from each other and their locations and arrangements are revealed by the measurement. In particular, the laser modified regions 130 formed by vertically linearly polarised light and horizontally linearly polarised are distinguished from each other. Therefore, four distinct types of laser modified region 130 are formed in the label 120.

FIG. 10 shows a practical implementation of the reader design shown in FIG. 3. It comprises an illumination device 1040 comprising a laser or LED light source and necessary optics for illumination of the label 120. The label 120 positioned so that light is transmitted through it to a detector 190 comprising a sensor and/or camera. The reader device of FIG. 10 therefore operates as a transmission-type reader.

FIG. 11 shows a practical implementation of the reader design shown in FIG. 7. It comprises an illumination device 1040 comprising a laser or LED light source and optics, a label 120 in a sample 110, and a detector 190 comprising a sensor and/or camera. The reader device of FIG. 11 operates as a reflection-type reader so that light from the illumination device 1040 reflects from the label before being sensed by the detector 190.

The invention claimed is:
1. A method of writing a label, the label displaying a visible layout of light-modified regions in a predetermined spatial arrangement, the method comprising:
    modifying regions of a material within the label using light, wherein the modifying comprises using light of a first polarisation state, which is one of left circular polarisation and right circular polarisation, to create chiral structures within the material and provide photo-induced optically active regions of a first type having a first optical activity state which is characteristic of having been formed by light of the first polarisation state, in order to encode covert information in the label using the locations of the first type of light-modified regions within the spatial arrangement of the label.

2. A method as claimed in claim 1, wherein the modifying comprises using light of a second polarisation state to provide photo-induced optically active regions of a second type having a second optical activity state which is characteristic of having been formed by light of the second polarisation state, in order to encode covert information in the label using the locations of the second type of light-modified regions within the spatial arrangement of the label.

3. A method as claimed in claim 2, wherein the modifying comprises using light of a third polarisation state to provide photo-induced optically active regions of a third type having a third optical activity state which is characteristic of having been formed by light of the third polarisation state, in order to encode covert information in the label using the locations of the third type of light-modified regions within the spatial arrangement of the label.

4. A method as claimed in claim 1, wherein the first polarisation state is one of linear polarisation, left circular polarisation, and right circular polarisation.

5. A method as claimed in claim 1, comprising defining the label as a portion of the material, and leaving unmodified at least a portion of the label; and/or
defining the label as an array of addressable locations within a portion of the material and predetermining for each location an optical property.

6. A method as claimed in claim 1, wherein the modifying comprises simultaneously modifying a plurality of regions of the material to provide light-modified regions of the first type; and/or
wherein modifying regions of the material within the label comprises using light of the first polarisation state and a first wavelength, and light of the first polarisation state and a second wavelength.

7. A method as claimed in claim 1, comprising providing a plurality of light-modified regions proximate one another to create a visible pixel.

8. A method as claimed in claim 1, wherein the laser pulse has a duration of less than 100 nanoseconds.

9. A non-transitory computer-readable storage medium comprising instructions which, when executed by a computer, cause the computer to perform the method of claim 1.

10. A labelling system for writing a label within a sample of a material, the label comprising a visible layout of light-modified regions in a predetermined spatial arrangement, the system comprising:
a light source for modifying regions of the sample using light; and
a polarisation apparatus for imparting any one of a plurality of polarisation states to the light for modifying the regions of the sample; and
further comprising
a beam splitting device for dividing the laser into a plurality of laser beams, each laser beam for simultaneously laser modifying a respective region of the sample;
wherein the polarisation apparatus comprises a plurality of polarisers each arranged for simultaneously polarising a respective one of each of the plurality of laser beams; and
optionally, wherein each of the plurality of polarisers comprises a linearly polarising element for imparting linear polarisation and a circularly polarising element for imparting circular polarisation.

11. A labelling system as claimed in claim 10, wherein the polarisation apparatus comprises a plurality of polarisers each arranged for simultaneously polarising a respective one of each of the plurality of laser beams; and, wherein each of the plurality of polarisers comprises a linearly polarising element for imparting linear polarisation and a circularly polarising element for imparting circular polarisation.

12. A labelling system as claimed in claim 10, comprising a plurality of shutters each operable to block a respective one of the plurality of laser beams; and/or
focusing optics arranged to focus each of the plurality of laser beams at a respective predetermined location within the sample for laser modifying respective regions of the sample and writing the label.

13. A labelling system as claimed in claim 10, wherein the plurality of laser beams are arranged to write in the sample along a straight line; and/or
wherein the plurality of laser beams are arranged to write in the sample in a two-dimensional array.

14. A labelling system as claimed in claim 10, wherein the light source is a laser for laser modifying regions of the sample using laser pulses, and wherein the laser has a pulse duration of less than 100 nanoseconds, and preferably less than 10 nanoseconds for laser modifying a sample.

15. A labelling system as claimed in claim 10, further comprising a controller for predetermining properties of the label to include a plurality of optically active modified regions and their locations within the label.

16. A sample comprising a label, wherein the label displays a visible layout of light-modified regions in a predetermined spatial arrangement and comprises:
a first light-modified region of a first type comprising chiral structures, which has been modified using light of a first polarisation state which is one of left circular polarisation and right circular polarisation, and has a first optical activity state characteristic of having been formed by light of the first polarisation state.

17. A sample as claimed in claim 16, comprising a second light-modified region of a second type which has been modified using light of a second polarisation state and has a second optical activity state characteristic of having been formed by light of the second polarisation state; and, optionally,
comprising a third light-modified region of a third type which has been modified using light of a third polarisation state and has a third optical activity state characteristic of having been formed by light of the third polarisation state.

18. A sample as claimed in claim 16, comprising a plurality of light-modified regions of the first type which have been modified using light of the first polarisation state and which have a first optical activity state characteristic of having been formed by light of the first polarisation state; and, optionally,
comprising a plurality of light-modified regions of a second type which have been modified using light of a second polarisation state and which have a second optical activity state characteristic of having been formed by light of the second polarisation state.

19. A method of encoding information including inputting information into a processor that is to be assigned to a label, encoding the information on the processor as covert information to be hidden in a spatial arrangement of different types of photo-induced optically active structures at different addressable locations in an array of light-modified regions in a material which is to form the label, outputting a signal for a light-writing apparatus to control the output of a light source between different output modes comprising at least left-circularly polarised light, right circularly polarised light, and linearly polarised light to induce different types of modification at different locations of the label to write the covert information within a visual layout of light-modified regions.

* * * * *